US006472978B1

(12) United States Patent
Takagi et al.

(10) Patent No.: US 6,472,978 B1
(45) Date of Patent: Oct. 29, 2002

(54) TRAFFIC SYSTEM TO PREVENT FROM ACCIDENTS

(75) Inventors: Masahito Takagi, Cambridge, MA (US); Ichiro Masaki, Boxboro, MA (US)

(73) Assignees: Yokogawa Electric Corporation, Tokyo (JP); Massacusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/721,807

(22) Filed: Nov. 24, 2000

(51) Int. Cl.[7] ................................................ B60Q 21/00

(52) U.S. Cl. ....................... 340/435; 340/437; 340/438; 340/904

(58) Field of Search ................................. 340/435, 944, 340/903, 904, 902, 905, 925, 907, 568.1, 436, 437, 438

(56) References Cited

U.S. PATENT DOCUMENTS 4,866,438 A * 9/1989 Knisch ........................ 340/936
5,289,183 A * 2/1994 Hassett et al. .............. 340/905
5,831,551 A * 11/1998 Geduld ........................ 340/905
6,049,295 A * 4/2000 Sato ........................... 340/928
6,064,301 A * 5/2000 Takahashi et al. .......... 340/435

* cited by examiner

*Primary Examiner*—Daniel J. Wu
*Assistant Examiner*—Son Tang
(74) *Attorney, Agent, or Firm*—Moonray Kojima

(57) ABSTRACT

An improved traffic accident preventing system to alarm both a driver on vehicle and pedestrian each other using a radio communication unit when they are located close. This system also provides a traffic monitoring and control system using communication between vehicle, pedestrian with communication unit and radio unit equipped by roadside, in which a traffic management center can send information to a specific vehicle and pedestrian with communication unit, and also receive information from them.

13 Claims, 10 Drawing Sheets

$$f_0 = \frac{1}{2\pi\sqrt{LC}}$$

605: MOVING DIRECTION OF THE VEHICLE 601
606: MOVING VELOCITY OF THE VEHICLE 601

TRAFFIC SYSTEM TO PREVENT FROM ACCIDENTS

BACKGROUND OF THE INVENTION

1. Field of Invention

This invention relates to a system for preventing traffic accidents between vehicles and pedestrians; and more particularly, to such a system utilizing radio communication therebetween.

2. Discussion of Prior Art

Heretofore, a radar system on a automotive vehicle can detect a pedestrian in front of a automotive vehicle, but field of vision of a radar system is as narrow as a that of a driver of a vehicle, so it is impossible to detect a pedestrian who suddenly rushes out in front of a vehicle in advance. And a radar system uses a millimeter wave, which has a sharp directivity and goes straightly, so a radar system cannot detect a pedestrian behind edge of intersection.

Examples of the related are comprise: U.S. Pat. No. 4,543,577; U.S. Pat. No. 5,522,509 and U.S. Pat. No. 6,081,223; Simon et al , Spread Spectrum Communication Handbook, Revised Edition, McGraw-Hill, 1994; and Morris et al, Airborn Pulsed Doppler Radar, 2nd Edition, Artech House, 1996. However, the art leaves much to be desired in terms of traffic safety, prevention of accidents, and use of latest technology to improve the quality of life with respect to vehicle traffic.

Heretofore, traffic management center monitors vehicles by using DSRC, ultrasonic beacon and optical beacon using communication units both on a vehicle and on roadside. In this case units on vehicles are relatively expensive.

OBJECTS

Accordingly several objects of our invention, it is possible to alarm and notify to a driver that a pedestrian locates near a vehicle, and call driver's attention to a pedestrian, even if a pedestrian is out of a driver's view field, and to prevent traffic accident. It is also possible to call pedestrian's attention to an approaching vehicle.

And it is also possible to alarm and notify to a driver that a pedestrian locates behind edge of intersection and to call driver's attention, so a driver can prepare for pedestrian's rushing suddenly out in front of a vehicle in advance.

And it is also possible to support investigation for the cause of the traffic accident by recording ID code of a vehicle and/or pedestrian, with time and location by each unit on a vehicle and with pedestrian.

Accordingly several objects of our invention, traffic management center can communicate vehicles using relatively cheep on-vehicle unit and can monitor traffic values, vehicle speeds, a route of a specific vehicle, so as to control traffic and keep appropriate traffic flow.

Further objects and advantages of our invention will become apparent from a consideration of the drawings and ensuing description thereof.

BRIEF DESCRIPTION OF THE DRAWINGS

The features and advantages of the present invention will be appreciated from the following description and drawings in which like reference numerals designate corresponding elements and in which:

FIGS. 2A and 2B show the potable resonant tag that pedestrian 103, 107 in FIG. 1 carries by.

FIG. 10 shows the potable transmitter/receiver 804 in FIG. 8 which the pedestrian 803 in FIG. 8 carries by.

DETAILED DESCRIPTION OF THE PREFERRED EMBODIMENTS

Figure 1:
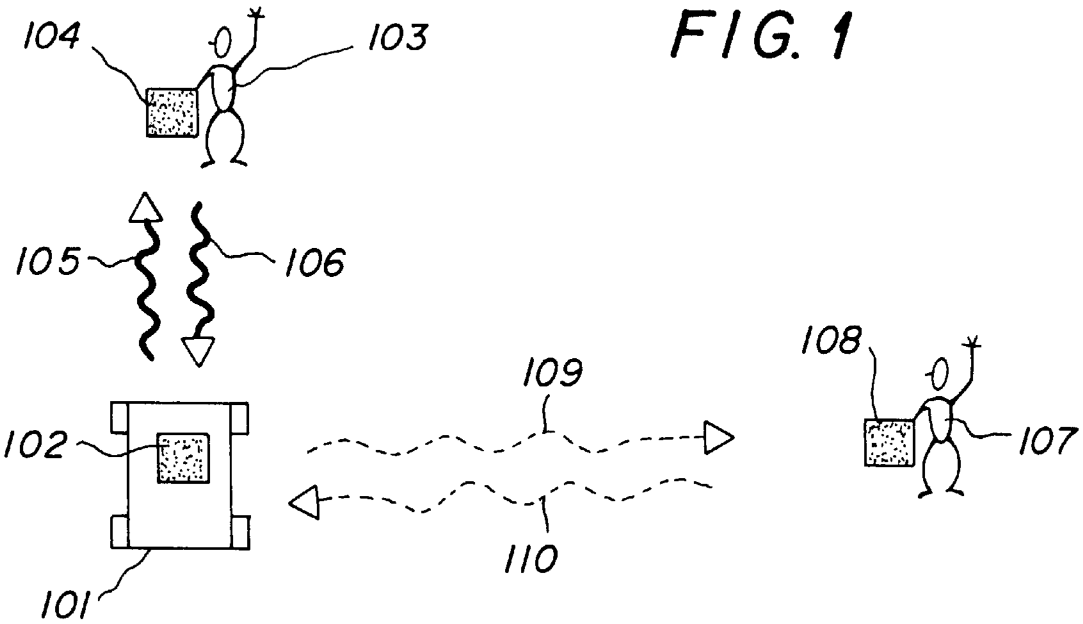
FIG. 1 shows the first preferred embodiment according to the present invention.

FIG. 1 shows the first preferred embodiment according to the present invention.

In FIG. 1, numeral 101 denotes a vehicle.

Numeral 102 denotes vehicle transmitter/receiver on a vehicle transmitting predetermined frequency signals and receiving echo signals from potable resonant tag that pedestrian located near the vehicle carries by.

Numeral 103 denotes pedestrian located near the vehicle 101.

Numeral 104 denotes potable resonant tag that pedestrian 103 located near the vehicle 101 carries by.

Numeral 105 denotes predetermined frequency signals transmitted by vehicle transmitter/receiver 102.

Numeral 106 denotes a echo signal from a potable resonant tag 104.

When vehicle transmitter/receiver 102 receives the echo signals then an alarm notifying to driver of vehicle 101 that there is a pedestrian 103 located near vehicle 101.

Numeral 107 denotes a pedestrian located far distance from the vehicle 101.

Numeral 108 denotes potable resonant tag that pedestrian 107 carries by.

Numeral 109 denotes predetermined frequency signals transmitted by vehicle transmitter/receiver 102 and attenuated when it reached a potable resonant tag 108.

Numeral 110 denotes echo signal from a potable resonant tag 108 and can not be received at vehicle transmitter/receiver by attenuation, so vehicle transmitter/receiver 102 does not produce an alarm.

Figure 2A:
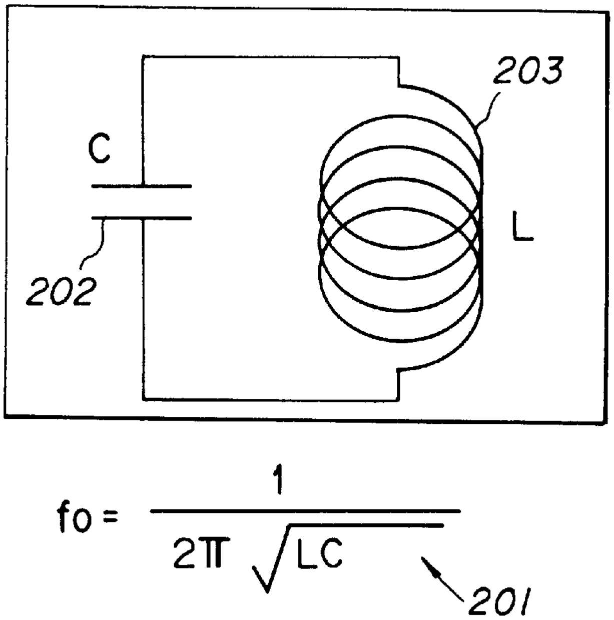
Figure 2B:
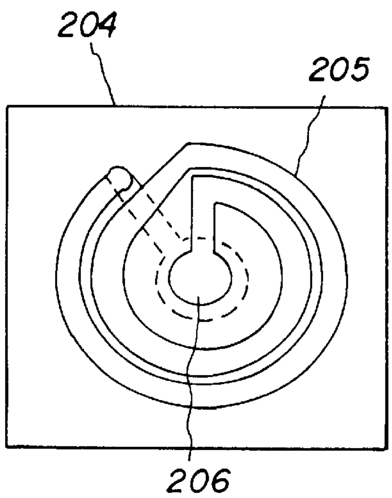

FIGS. 2A and 2B show the potable resonant tag that pedestrian 103, 107 in FIG. 1 carries by.

FIG. 2A shows electrical equivalent circuit of the potable resonant tag.

In FIG. 2A numeral 202 denotes electric capacitance valued C.

Numeral 203 denotes electric inductance valued L.

Numeral 201 denotes a equation defining a resonant frequency with C and L, which is equal to the frequency of the predetermined frequency signals.

FIG. 2B shows the feature of the potable resonant tag.

Numeral 204 denotes an insulator such as paper.

Numeral 205 denotes a electric inductance formed by printing a conductance such a aluminum foil in a coil state on the insulator 204.

Numeral 206 denotes a electric capacitance formed by printing a conductance such a aluminum on both side of the insulator 204.

Both a electric inductance 205 and a electric capacitance are connected parallel and forms a resonant unit.

Figure 3:
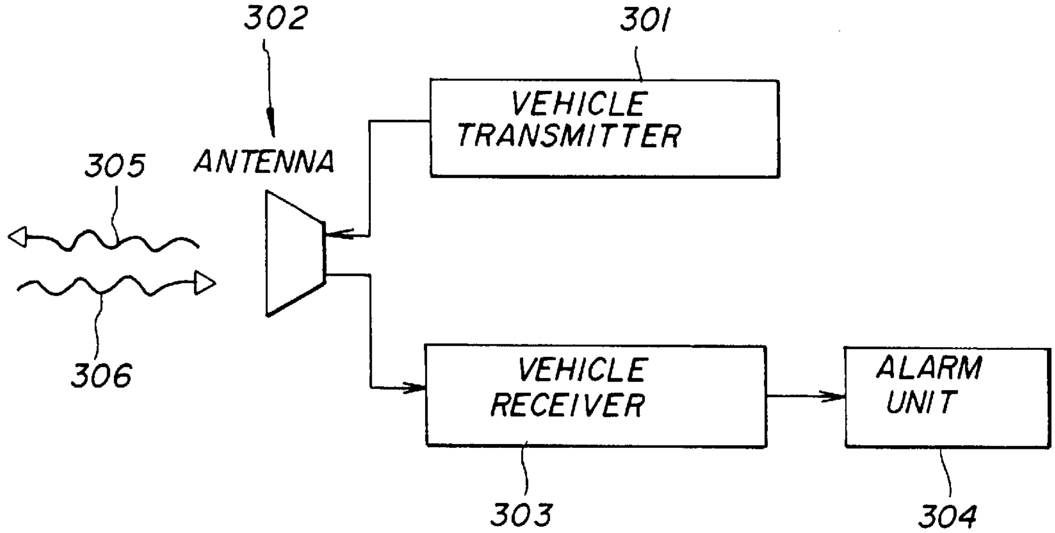
FIG. 3 shows the vehicle transmitter/receiver 102 in FIG. 1.

FIG. 3 shows the vehicle transmitter/receiver 102 in FIG. 1.

In FIG. 3, numeral 301 denotes vehicle transmitter generating a predetermined frequency signal.

Numeral 302 denotes an antenna.

Numeral 305 denotes the predetermined frequency signals which generated by vehicle transmitter 301 and transmitted by the antenna 302.

Numeral 306 denotes the echo signal of the predetermined frequency signals 305 reflected by the potable resonant tag 104 in FIG. 1 carried by the pedestrian 103 in FIG. 3, when the pedestrian 103 in FIG. 1 is located near the vehicle 101 in FIG. 1.

Numeral 303 denotes vehicle receiver unit receiving the echo signal 306 through the antenna 302.

Numeral 304 denotes the alarm unit generating an alarm to a driver on vehicle notifying that there is a pedestrian who carries by the potable resonant tag 104 in FIG. 1 near a vehicle 101 in FIG. 1 when the vehicle transmitter/receiver receives the echo signal 306.

Figure 4:
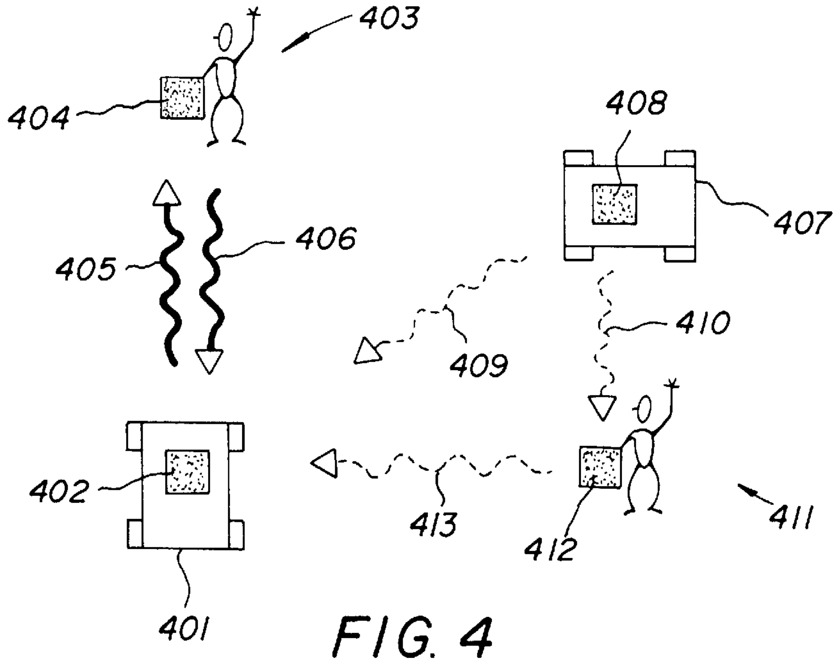
FIG. 4 shows the second preferred embodiment according to the present invention.

FIG. 4 shows the second preferred embodiment according to the present invention.

In FIG. 4, numeral 401 denotes a 1st vehicle.

Numeral 402 denotes a 1st vehicle transmitter/receiver on the 1st vehicle 401.

Numeral 403 denotes a 1st pedestrian.

Numeral 404 denotes a 1st potable resonant tag which carried by the 1st pedestrian 403, and which reflects echo signal of transmitted signal by the 1st vehicle transmitter/receiver 402 when the 1st pedestrian 403 is located near the 1st vehicle 401.

Numeral 405 denotes signals transmitted by the 1st vehicle transmitter/receiver 402.

Numeral 406 denotes echo signal from the potable resonant tag 404.

When the 1st vehicle transmitter/receiver 402 receives the echo signal 406, it produces an alarm for the driver on the 1st vehicle notifying that the 1st pedestrian 403 is located near the 1st vehicle 401.

In this case both the signals 406 and the echo signal 406 are modulated by the same pseudo noise, so the 1st vehicle transmitter/receiver 402 demodulates the echo signal 406 and produces an alarm.

Numeral 407 denotes a 2nd vehicle.

Numeral 408 denotes a 2nd vehicle transmitter/receiver on the 2nd vehicle 407.

Numeral 411 denotes a 2nd pedestrian.

Numeral 412 denotes a 2nd potable resonant tag which carried by the 2nd pedestrian 411.

Numeral 409 denotes transmitted signal by the 2nd vehicle transmitter/receiver 408 and received by the 1st vehicle transmitter/receiver 402.

Numeral 410 denotes transmitted signal by the 2nd vehicle transmitter/receiver 408 and reflected by the 2nd potable resonant tag 412.

Numeral 413 denotes echo signal of the signal 410 reflected by the 2nd potable resonant tag 412.

Even when the 2nd vehicle 407 is approaching to the 1st vehicle 401 and the 1st vehicle transmitter/receiver 402 receives the signal 409, the 1st vehicle transmitter/receiver 402 doesnt demodulate the signal and does not produce an alarm, because the signal 409 is moderated by different pseudo noise of the let vehicle transmitter/receiver.

When the 1st vehicle transmitter/receiver 402 receives the echo signals 413, the 1st vehicle transmitter/receiver 402 doesnt demodulate the signal and does not produce an alarm, because the echo wave 413 is moderated by different pseudo noise of the 1st vehicle transmitter/receiver.

Figure 5:
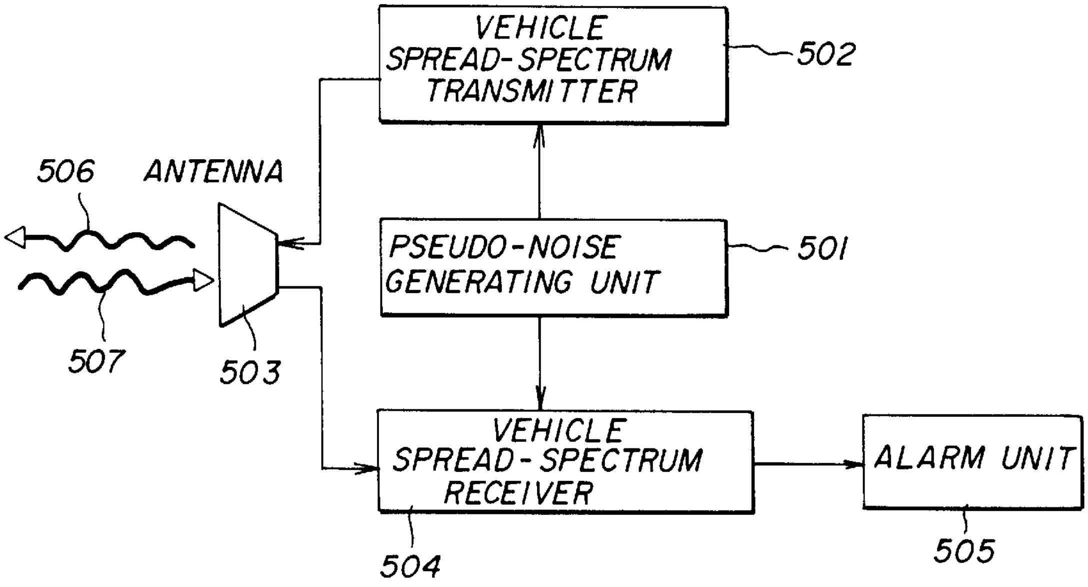
FIG. 5 shows the vehicle transmitter/receiver 402 in FIG. 4.

FIG. 5 shows the vehicle transmitter/receiver 402 in FIG. 4.

In FIG. 5, numeral 501 denotes a pseudo noise generating unit which generates a unique pseudo noise for a vehicle 401 in FIG. 4.

Numeral 502 denotes a vehicle spread-spectrum transmitter which modulates a signal using the pseudo noise generated by the pseudo noise generating unit 501.

Numeral 503 denotes an antenna which transmits a spread-spectrum signal generated by the vehicle spread-spectrum transmitter 502 as a signal 506.

Numeral 504 denotes a vehicle spread-spectrum receiver which demodulates a echo signal 507, which reflected by the potable resonant tag 404 in FIG. 4 and received by the antenna 503.

Numeral 505 denotes an alarm unit producing an alarm to the driver on vehicle 401 notifying that there is the pedestrian 403 near the vehicle 401 when the vehicle transmitter/receiver 500 receives the echo signal 507 which modulated by the same pseudo noise as one which generated by the pseudo noise generating unit 501.

An alarm unit 505 does not generate an alarm to the driver on vehicle 401 even when the vehicle transmitter/receiver 600 receives echo signal from other than the vehicle transmitter/receiver 500, because of modulated by different pseudo noise from one that generated by the pseudo noise generating unit 501.

Figure 6:
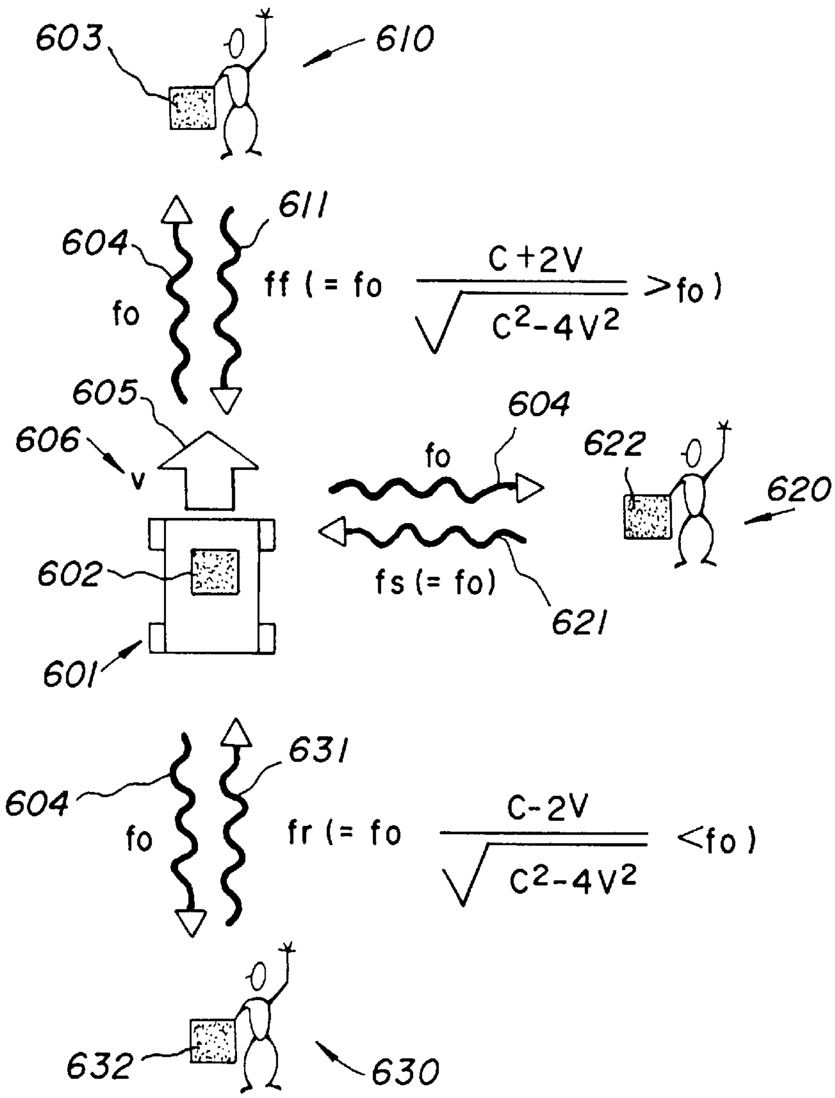
FIG. 6 shows the third preferred embodiment according to the present invention.

FIG. 6 shows the third preferred embodiment according to the present invention.

In FIG. 6, numeral 601 denotes a vehicle.

Numeral 602 denotes a vehicle transmitter/receiver on the vehicle 601 which can select a frequency of receiving signals.

Numeral 605 denotes a moving direction of the vehicle 601.

Numeral 606 denotes a moving velocity of the vehicle 601.

Numeral 604 denotes a predetermined frequency signals in frequency of transmitted by vehicle transmitter/receiver 602.

Numeral 610 denotes a 1st pedestrian located in forward of moving direction for the vehicle 601.

Numeral 611 denotes an echo signal from a 1st potable resonant tag 603.

Numeral 603 denotes a 1st potable resonant tag, which receives the predetermined frequency signals 604, resonates, and reflect the echo signal 611.

The vehicle transmitter/receiver 602 receives the echo signal 611 which has increased frequency ff by Doppler effect of moving vehicle 601 in velocity v when the 1st pedestrian 610 is located near in forward of moving direction for the vehicle 601, and recognizes and notifies to the driver of the vehicle 601 that the 1st pedestrian 610 is located near in forward of moving direction for the vehicle 601 because of the frequency of the echo signal 611 ff is higher than that of the predetermined frequency signals 604 in frequency fo.

Numeral 620 denotes a 2nd pedestrian located at right angles to moving direction for the vehicle 601.

Numeral 621 denotes an echo signal from a 2nd potable resonant tag 622.

Numeral 622 denotes a 2nd potable resonant tag, which receives the predetermined frequency signals 604, resonates, and reflect the echo wave 621.

The vehicle transmitter/receiver 602 receives the echo wave 621 which has the same frequency fs (=fo) as frequency of the predetermined frequency signals 604 when a 2nd pedestrian 620 is located near at right angles to moving direction for the vehicle 601, and recognizes and notifies to the driver of the vehicle 601 that the 2nd pedestrian 620 is located near at right angles to moving direction for the vehicle 601 because of the frequency of the echo wave 621 fs is the same as that of the predetermined frequency signals 604 in frequency fo.

Numeral 630 denotes a 3rd pedestrian locating in backward of moving direction for the vehicle 601.

Numeral 631 denotes an echo signal from a 3rd potable resonant tag 632.

Numeral 633 denotes a 3rd potable resonant tag, which receives the predetermined frequency signals 604, resonates, and reflect the echo signal 631.

The vehicle transmitter/receiver 602 receives the echo signal 631 which has decreased frequency fr by Doppler effect of moving vehicle 601 in velocity v when the 3rd pedestrian 630 is located near in backward of moving direction for the vehicle 601, and recognizes and notifies to the driver of the vehicle 601 that the 3rd pedestrian 630 is located near in backward of moving direction for the vehicle 601 because of the frequency of the echo signal 631 fr is lower than that of the predetermined frequency signals 604 in frequency fo.

Figure 7:
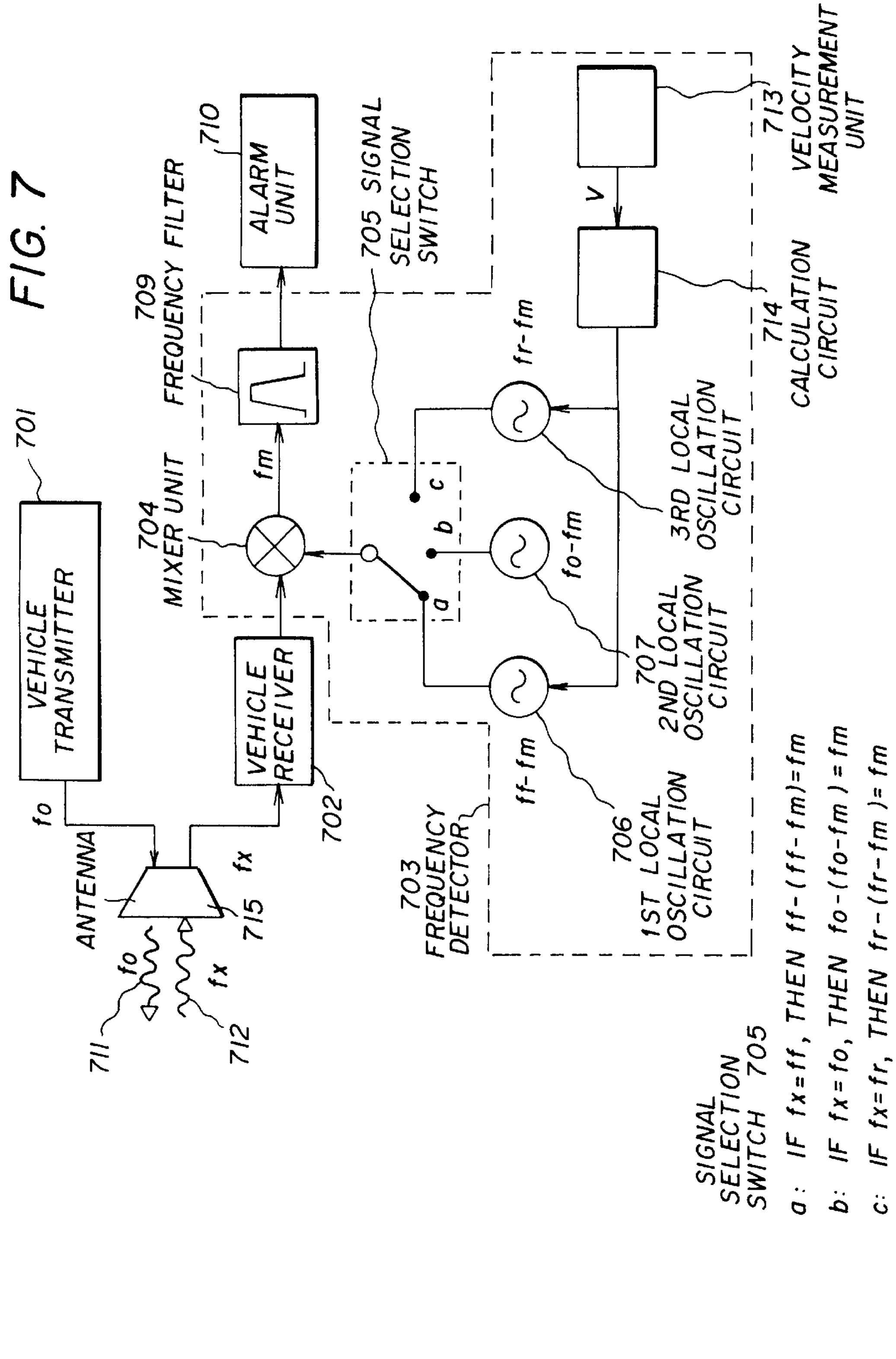
FIG. 7 shows the vehicle transmitter/receiver 602 in FIG. 6 on the vehicle 601 in FIG. 6.

FIG. 7 shows the vehicle transmitter/receiver 602 in FIG. 6 on the vehicle 601 in FIG. 6.

In FIG. 7, numeral 715 denotes an antenna.

Numeral 701 denotes a vehicle transmitter which transmits a predetermined frequency signals in frequency of through the antenna 715.

Numeral 711 denotes a predetermined frequency signal in frequency of transmitted by the vehicle transmitter 701.

Numeral 712 denotes a echo signals in frequency fx from the potable resonant tag 603, 622, 632 in FIG. 6.

Numeral 702 denotes a vehicle receiver which receives an echo signal 712 through the antenna 715.

Numeral 703 denotes a frequency detector which selects receiving frequency and so as to detect the frequency of the echo signals 712.

Numeral 705 denotes a signal select switch.

Numeral 704 denotes a mixer unit which converts a frequency fx of the echo signals 712 from the vehicle receiver 702 into a frequency fm by subtracting the frequency fx from a frequency selected by the signal select switch 705.

Numeral 709 denotes a frequency filter which passes through only a signal in frequency fm.

Numeral 710 denotes a alarm unit which produces an alarm to the driver on vehicle 601 in FIG. 6 only when the signal from the mixer unit 704 passes through the frequency filter 709.

Numeral 706 denotes a 1st local oscillation unit which generates a signal in frequency (ff-fm).

Numeral 707 denotes a 2nd local oscillation unit which generates a signal in frequency (fo-fm).

Numeral 708 denotes a 3rd local oscillation unit which generates a signal in frequency (fr-fm).

The signal selection switch 705 selects one of the three signals, (ff-fm) generated by the 1st local oscillation unit 706, (fo-fm) generated by the 2nd local oscillation unit 707, (fr-fm) generated by the 3rd local oscillation unit 708, and transfers it to the mixer unit 704.

Herein of means a frequency of the predetermined frequency signal 711 transmitted by the vehicle transmitter 701, ff means a increasing frequency of Doppler effect when the vehicle 601 in FIG. 6 is approaching to the potable resonant tag 603 in FIG. 6 by velocity v, and fr means a decreasing frequency of Doppler effect when the vehicle 601 in FIG. 6 is departure from the potable resonant tag 603 in FIG. 6 by velocity v, and fm means a frequency only which the frequency filter 709 passes through.

Numeral 713 denotes a velocity measurement unit which measures a velocity of the vehicle 601 in FIG. 6.

Numeral 714 denotes a calculation unit which calculates ff=fo×(c+2v)/√4(c^2−v^2), fr=fo×(c−2v)/√4(c^2−v^2) using velocity value v measured by the velocity measurement unit 713 and controls oscillation frequencies of both the 1st local oscillation unit 706 and the 3rd local oscillation unit 708.

The signal selection switch 705 selects one of the following three modes;

a) The alarm unit 710 produces an alarm to the driver only when a pedestrian is located near in forward of moving direction for the vehicle 601 in FIG. 6.

b) The alarm unit 710 produces an alarm to the driver only when a pedestrian is located near at right angles to moving direction for the vehicle 601 in FIG. 6.

c) The alarm unit 710 produces an alarm to the driver only when a pedestrian is located near in backward of moving direction for the vehicle 601 in FIG. 6.

Figure 8:
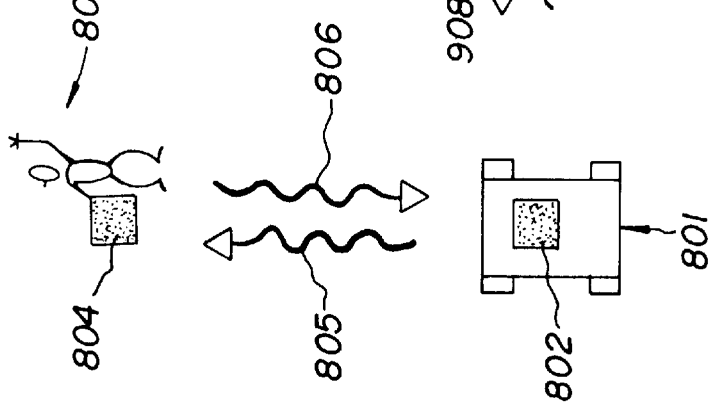
FIG. 8 shows the fourth preferred embodiment according to the present invention.

FIG. 8 shows the fourth preferred embodiment according to the present invention.

In FIG. 8, numeral 801 denotes a vehicle.

Numeral 802 denotes a vehicle transmitter/receiver on the vehicle 801.

Numeral 805 denotes a vehicle signal which transmitted by the vehicle transmitter/receiver 802.

Numeral 803 denotes a pedestrian.

Numeral 806 denotes a pedestrian signal.

Numeral 804 denotes a potable transmitter/receiver which is carried by the pedestrian 803 and receives the vehicle signal 805, detects pseudo noise from the vehicle signal 805, modulates signal by the detected pseudo noise, and transmits the pedestrian signal 806. The potable transmitter/receiver 804 transmits the pedestrian signal 806 which is spread-spectrum modulated by the same pseudo noise as that of the vehicle signal 805, when the pedestrian 803 is located near the vehicle 801.

When the vehicle transmitter/receiver 802 receives the pedestrian signal 806 modulated by the same pseudo noise as that of the vehicle signal 805 by transmitted by itself, the vehicle transmitter/receiver 802 produces an alarm to the driver on vehicle 801 notifying that there is the pedestrian 803 near the vehicle 801. The vehicle transmitter/receiver 802 does not produce an alarm when the pedestrian 803 isn't located near the vehicle 801, because the vehicle signal 805 does not arrive at the potable transmitter/receiver 804 by propagation attenuation, so the potable transmitter/receiver 804 does not transmitted the pedestrian signal 806.

The pedestrian signal 806 is modulated by the same pseudo noise as that of the vehicle signal 805, so the vehicle transmitter/receiver 802 demodulates the pedestrian signal 806 and produces an alarm.

When the potable transmitter/receiver 804 receives the vehicle signal 805, the potable transmitter/receiver 804 produces an alarm to the pedestrian 803 notifying that there is the vehicle 801 near the pedestrian 803. The potable transmitter/receiver 804 does not produce an alarm when the vehicle 801 isn't located near the pedestrian 803, because the vehicle signal 805 does not arrive at the potable transmitter/receiver 804 by propagation attenuation.

Figure 9:
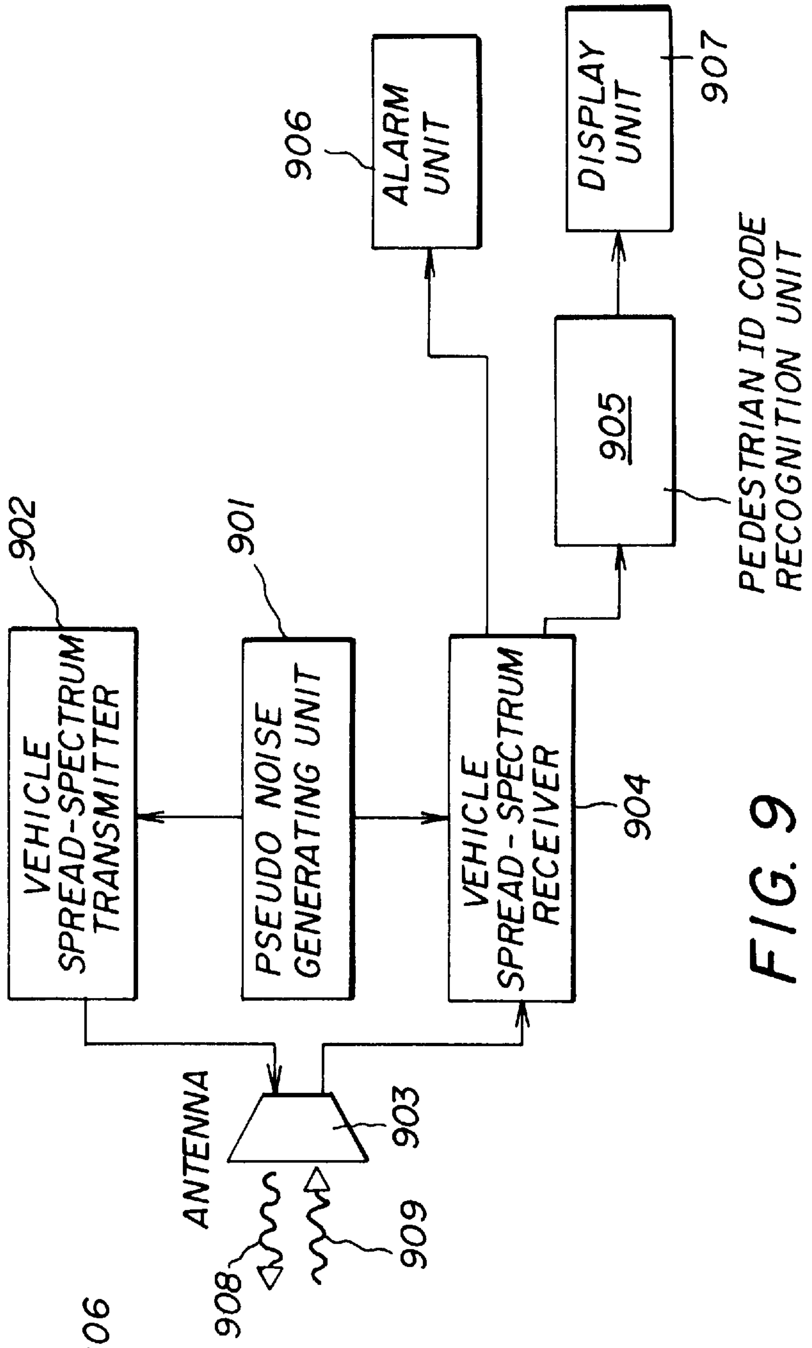
FIG. 9 shows the vehicle transmitter/receiver 802 in FIG. 8 on the vehicle 801 in FIG. 8.

FIG. 9 shows the vehicle transmitter/receiver 802 in FIG. 8 on the vehicle 801 in FIG. 8.

In FIG. 9, numeral 900 denotes a vehicle transmitter/receiver.

Numeral 901 denotes a pseudo noise generating unit which generates a unique pseudo noise corresponding to a vehicle ID code of the vehicle 801 in FIG. 8.

Numeral 902 denotes a vehicle spread-spectrum transmitter which modulates a signal using the pseudo noise generated by the pseudo noise generating unit 901.

Numeral 903 denotes an antenna which transmits a spread-spectrum signal generated by the vehicle spread-spectrum transmitter 902 as a vehicle signal 908.

Numeral 904 denotes a vehicle spread-spectrum receiver which demodulates a pedestrian signal 909 using the pseudo noise generated by the pseudo noise generating unit 901, which transmitted by the potable transmitter/receiver 804 in FIG. 8.

Numeral 906 denotes an alarm unit which produces an alarm to the driver on vehicle 801 in FIG. 8 when the vehicle spread-spectrum receiver 904 demodulates the pedestrian signal 909.

When the antenna 903 receives the pedestrian signal 909 which is response signal of the other vehicle transmitter/receiver than the vehicle transmitter/receiver 802 in FIG. 8, the vehicle spread-spectrum receiver 904 does not demodulate the pedestrian signal 909 because its pseudo noise is difference from that generated by the pseudo noise generating unit 901, so the vehicle spread-spectrum receiver 904 does not produce a trigger signal to the alarm unit 906, then the alarm unit 906 does not produce an alarm.

Numeral 905 denotes a pedestrian ID code recognition unit which demodulates the pedestrian ID code of the pedestrian 803 in FIG. 8 from an output signal of the vehicle spread-spectrum receiver 904.

Numeral 907 denotes a display unit; which notifies the pedestrian ID code of the pedestrian 803 to the driver on vehicle 801 in FIG. 8.

Figure 10:
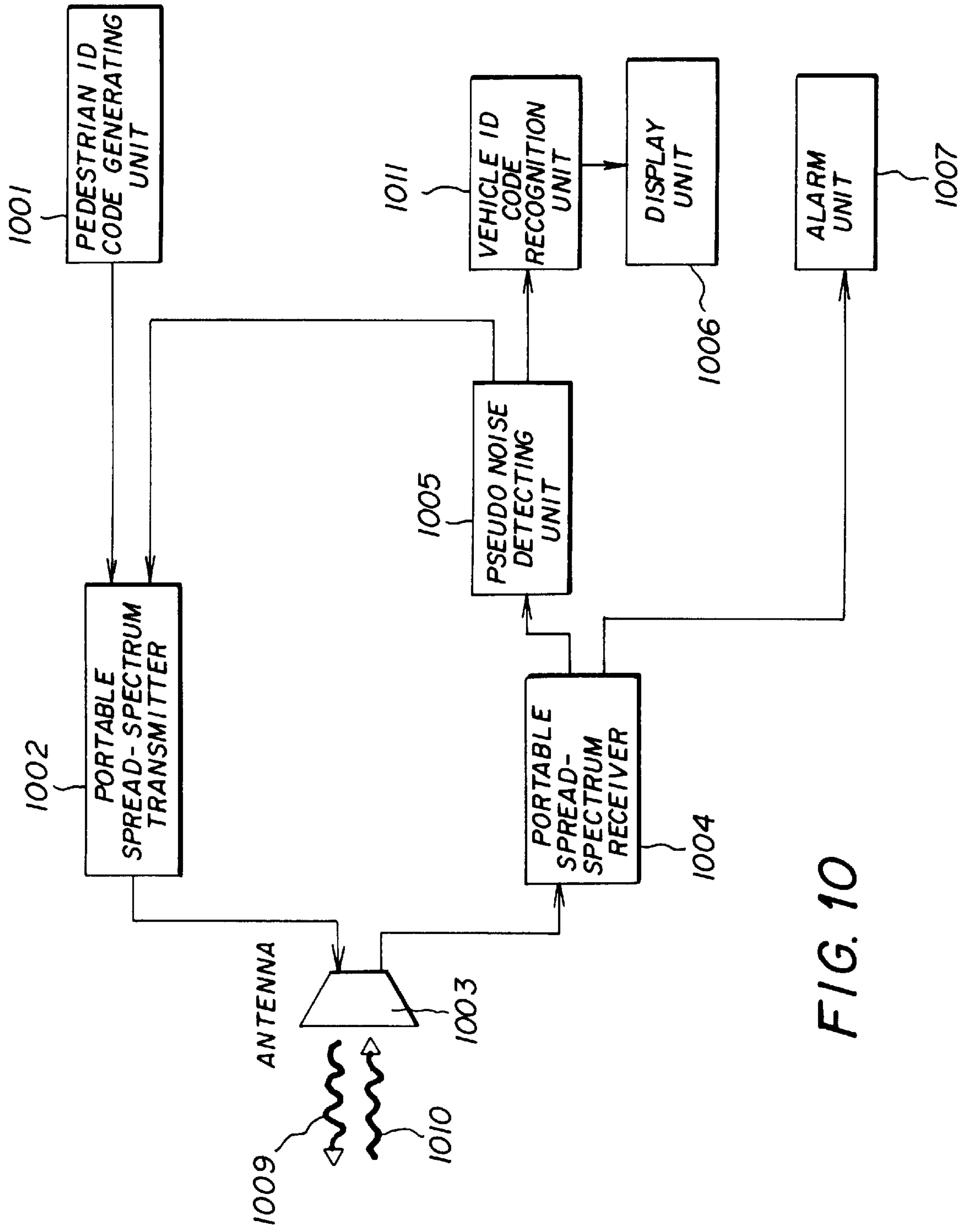

FIG. 10 shows the potable transmitter/receiver 804 in FIG. 8 which the pedestrian 803 in FIG. 8 carries by.

In FIG. 10, numeral 1003 denotes an antenna.

Numeral 1004 denotes a potable spread-spectrum receiver which receives the vehicle signal 1010 through the antenna 1003.

Numeral 1007 denotes an alarm unit which produce an alarm to the pedestrian 803 in FIG. 8 notifying that there is a vehicle near the pedestrian 803 in FIG. 8 when the potable spread-spectrum receiver 1004 receives the vehicle signal 1010.

Numeral 1005 denotes a pseudo noise detection unit which detect a pseudo noise from the vehicle signal 1010.

Numeral 1011 denotes a vehicle ID code recognition unit which converts the pseudo noise into a vehicle ID code.

Numeral 1006 denotes a display unit which notifies the vehicle ID code to the pedestrian 803 in FIG. 8.

Numeral 1001 denotes a pedestrian ID code generating unit which generates a pedestrian ID code of the pedestrian 803.

Numeral 1002 denotes a potable spread-spectrum transmitter which modulates the pedestrian ID code using the pseudo noise detected by the pseudo noise detection unit 1005.

The potable spread-spectrum transmitter 1002 uses the pseudo noise detected from the vehicle signal 1010 by the pseudo noise detection unit 1005 and so the pedestrian signal 1009 is modulated by the same pseudo noise as that of the vehicle signal 1010, then vehicle transmitter/receiver 802 in FIG. 8 demodulates the pedestrian signal 1009.

Figure 11:
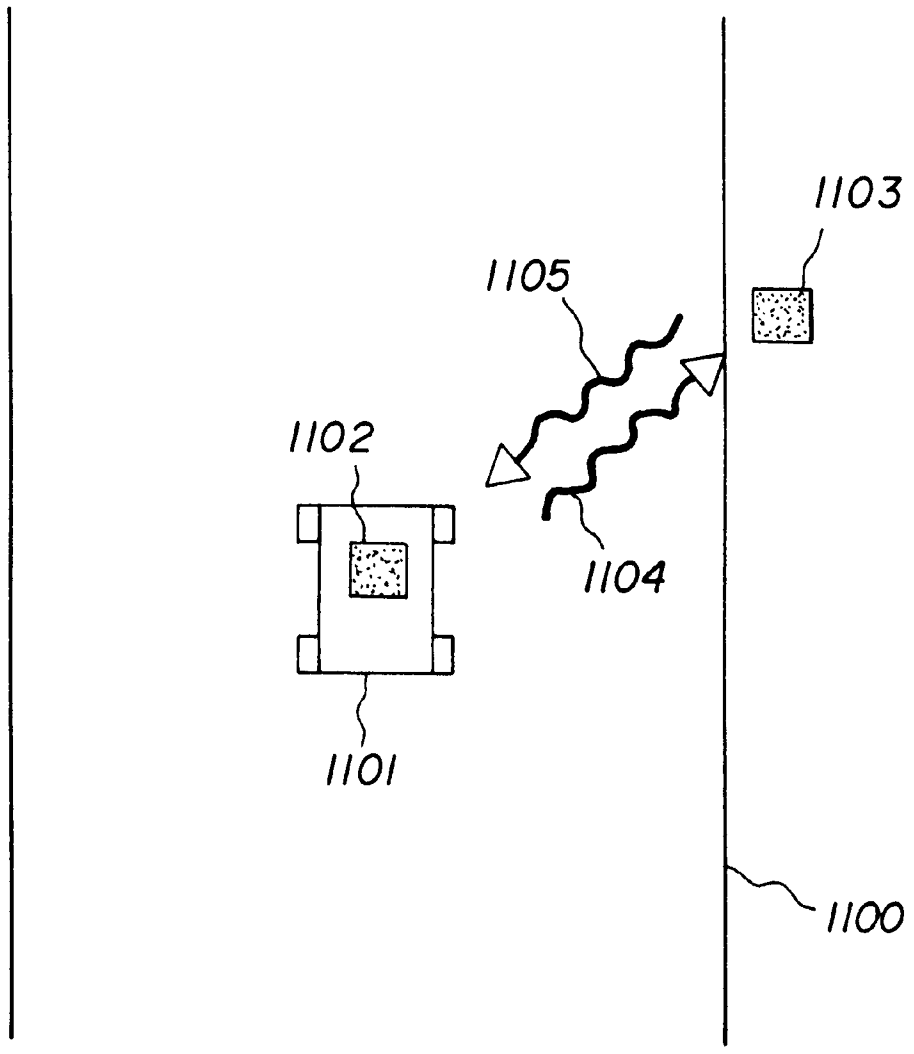
FIG. 11 shows the fifth preferred embodiment according to the present invention.

FIG. 11 shows the fifth preferred embodiment according to the present invention.

In FIG. 11, numeral 1000 denotes a road.

Numeral 1103 denotes a roadside transmitter/receiver which equipped at roads.

Numeral 1101 denotes a vehicle.

Numeral 1102 denotes a vehicle transmitter/receiver.

Numeral 1104 denotes a vehicle signal which is transmitted by the vehicle transmitter/receiver 1102 and is received by the roadside transmitter/receiver 1103.

Numeral 1105 denotes a roadside signal which is transmitted by the roadside transmitter/receiver 1103 and is received by the vehicle transmitter/receiver 1102.

When the vehicle 1101 is approaching to the roadside transmitter/receiver 1103, the roadside transmitter/receiver 1103 receives the vehicle signal 1104 and transmits the roadside signal 1105 as a response signal.

The roadside transmitter/receiver 1103 detects a pseudo noise from the vehicle signal 1104 and then the roadside transmitter/receiver 1103 converts the pseudo noise into the vehicle ID code of the vehicle 1101 in FIG. 11. The roadside transmitter/receiver 1103 transmits the roadside signal 1105 modulated by the pseudo noise detected from the vehicle signal 1104.

Figure 12:
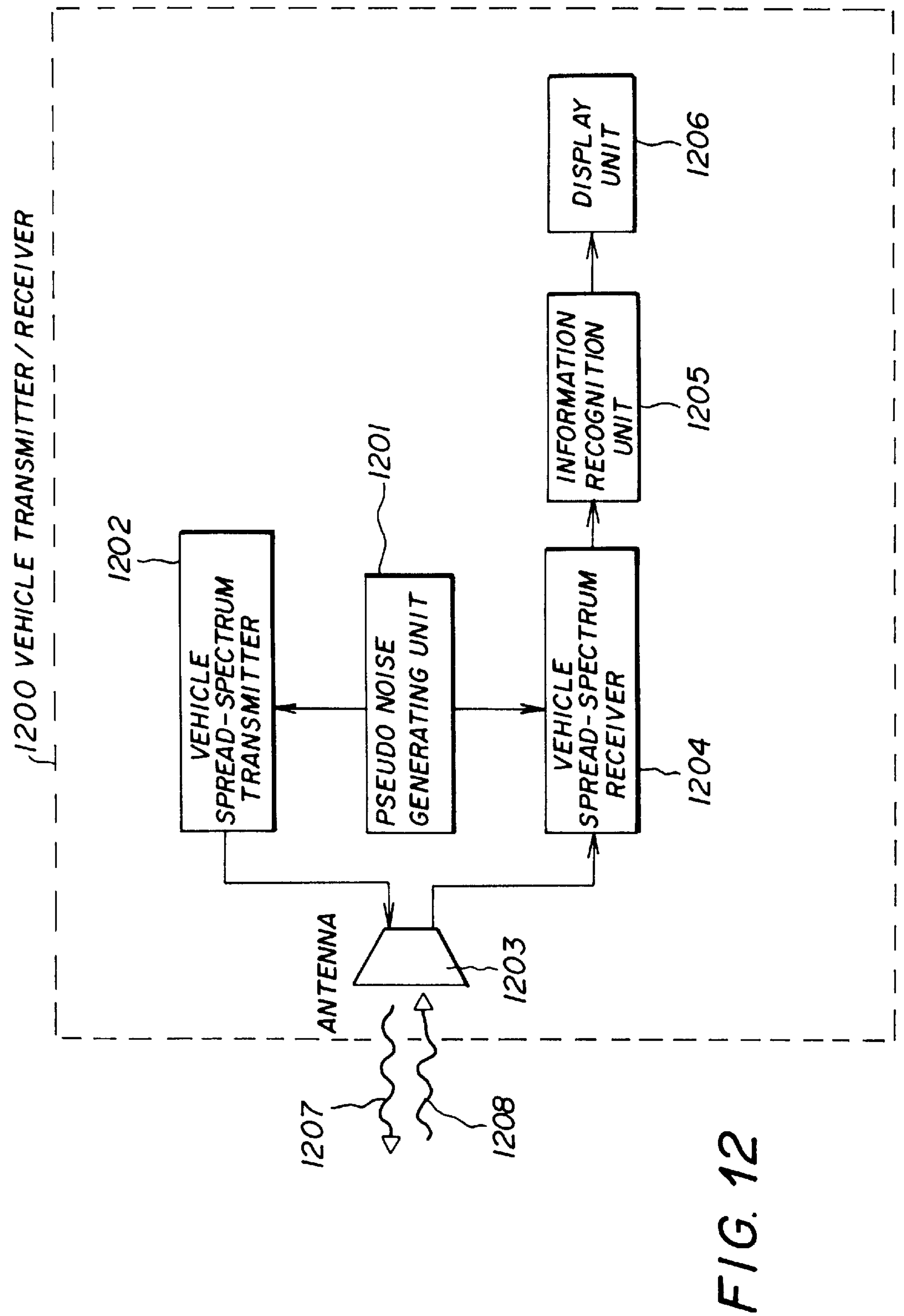
FIG. 12 shows the vehicle transmitter/receiver 1102 in FIG. 11.

FIG. 12 shows the vehicle transmitter/receiver 1102 in FIG. 11.

In FIG. 12, numeral 1200 denotes a vehicle transmitter/receiver.

Numeral 1201 denotes a pseudo noise generating unit which generates a unique pseudo noise corresponding to a vehicle ID code of the vehicle 1101 in FIG. 11.

Numeral 1202 denotes the vehicle spread-spectrum transmitter which modulates a signal using the pseudo noise generated by the pseudo noise generating unit 1201.

Numeral 1203 denotes an antenna.

Numeral 1207 denotes the vehicle signal which is transmitted by the vehicle spread-spectrum transmitter 1202 through the antenna 1203.

Numeral 1208 denotes the roadside signal which is transmitted by the roadside transmitter/receiver 1103 in FIG.

Numeral 1204 denotes a vehicle spread-spectrum receiver which demodulates the roadside signal 1208 using the pseudo noise generated by the pseudo noise generating unit 1201.

Numeral 1205 denotes an information recognition unit which demodulates an information from the output signal of the vehicle spread-spectrum receiver 1204.

Numeral 1206 denotes a display unit which notifies the information to the driver of the vehicle 1101 in FIG. 11.

When the antenna 1203 receives the roadside signal 1208 which is response signal of the other vehicle transmitter/receiver than the vehicle transmitter/receiver 1102 in FIG. 11, the vehicle spread-spectrum receiver 1204 does not demodulate the roadside signal 1208 because its pseudo noise is difference from that generated by the pseudo noise generating unit 1201, so the vehicle spread-spectrum receiver 1204 does not transfer a signal to the information recognition unit 1205, then the display unit 1206 does not display any information.

Figure 13:
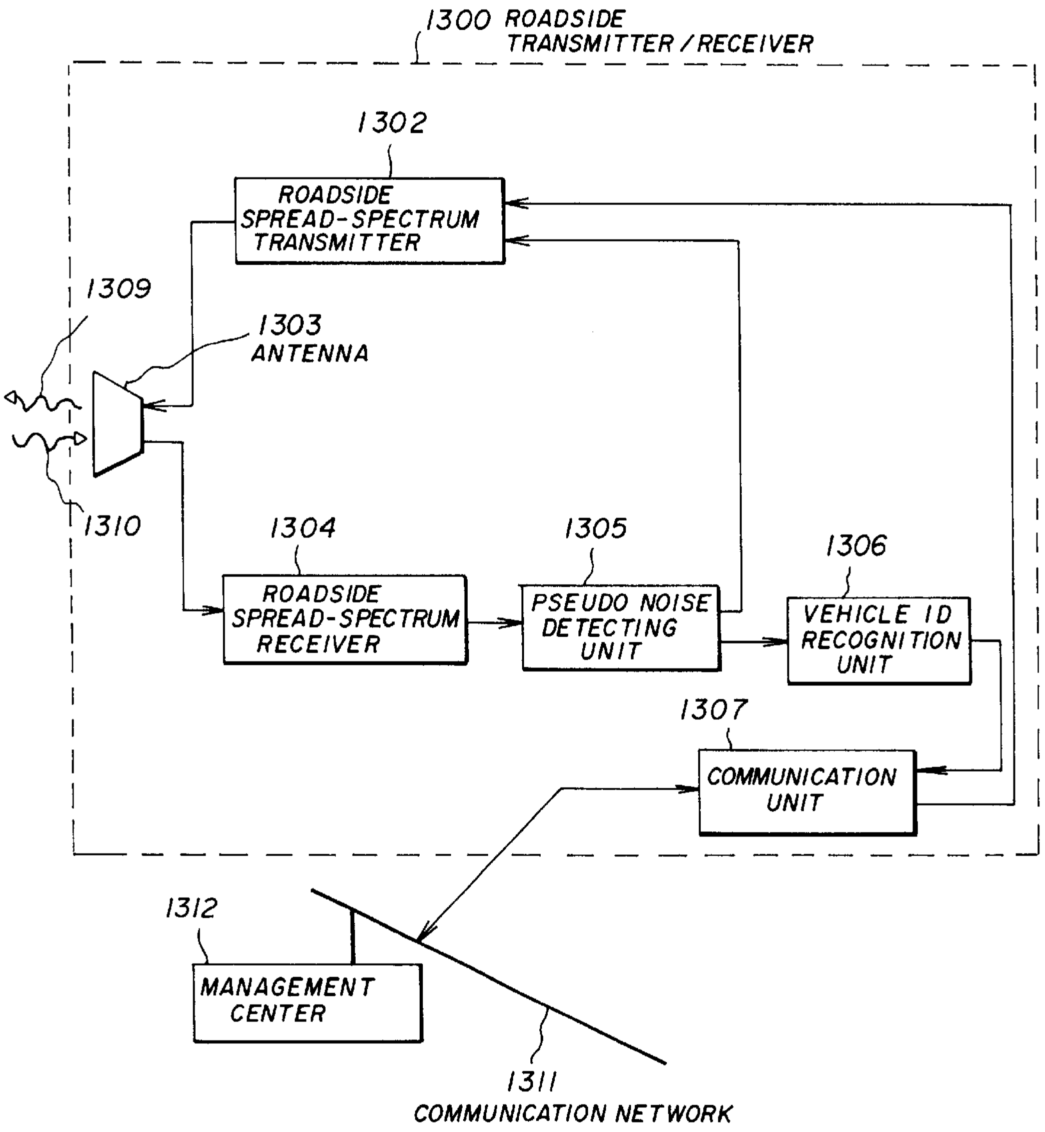
FIG. 13 shows the roadside transmitter/receiver 1103 in FIG. 11.

FIG. 13 shows the roadside transmitter/receiver 1103 in FIG. 11.

In FIG. 13, numeral 1300 denotes the roadside transmitter/receiver 1103 in FIG. 11.

Numeral 1309 denotes a roadside signal which is transmitted by the roadside transmitter/receiver 1300.

Numeral 1310 denotes a vehicle signal which is received by the roadside transmitter/receiver 1300.

Numeral 1303 denotes an antenna.

Numeral 1304 denotes a roadside spread-spectrum receiver which receives the vehicle signal through the antenna 1303.

Numeral 1305 denotes a pseudo noise detecting unit which detect a pseudo noise from the vehicle signal 1310.

Numeral 1306 denotes the vehicle ID recognition unit which converts a signal from the pseudo noise detecting unit 1305 into the vehicle ID code.

Numeral 1307 denotes a communication unit.

Numeral 1311 denotes a communication network.

Numeral 1312 denotes a management center.

The communication unit 1307 transmits the vehicle ID code to the management center 1312 on the communication network 1311.

Numeral 1302 denotes a roadside spread-spectrum transmitter which receives the information to be notified for the vehicle driver from the communication unit 1307, and modulates the information using the pseudo noise detected by the pseudo noise detecting unit 1305, and transmits it as the roadside signal 1309 through the antenna 1303.

The roadside spread-spectrum transmitter 1302 uses the pseudo noise detected from the vehicle signal 1310 by the pseudo noise detecting unit 1305, so the roadside signal 1309 is modulated by the same pseudo noise as that of the vehicle signal 1310, then vehicle transmitter/receiver 1102 in FIG. 11 demodulate that the roadside signal.

A management center 1312 sets and alters the information to be notified for the vehicle driver using by the communication unit 1307 and the communication network 1311.

While, the above description contains many specificities, these should not be construed as limitations on the scope of the invention, but rather as an exemplification of one preferred embodiment thereof. Many other variations are possible, for example;

(a) A vehicle transmitter/receiver in FIGS. 3, 5, 7, 9, 12 and a potable transmitter/receiver in FIG. 10 can be united with a cellular phone so as to reduce costs.

(b) A vehicle transmitter/receiver in FIGS. 3, 5, 7, 9, 12 and a potable transmitter/receiver in FIG. 10 and a roadside transmitter/receiver in FIG. 13 can be connected with GPS receiver and transmit a location data with other information described above.

(c) A vehicle transmitter/receiver in FIGS. 3, 5, 7, 9, 12 and a potable transmitter/receiver in FIG. 10 and a roadside transmitter/receiver in FIG. 13 can be connected with a recorder and clock so as to save information described above.

It is possible to support investigation for the cause of the traffic accident to record vehicle/pedestrian ID code, time and location by each unit on a vehicle and with pedestrian.

(d) A potable transmitter/receiver in FIG. 10 and the roadside transmitter/receiver in FIG. 13 communicate each other.

Accordingly, the scope of the invention should be determined not by the embodiment illustrated, but by the appended claims and their legal equivalents.

What is claimed is:

1. A communication system for preventing accidents between a pedestrian and a vehicle, said system comprising:

portable tag means to be carried by said pedestrian for receiving a first signal, and for providing and transmitting a second signal; and vehicle means to be installed in said vehicle for generating and transmitting said first signal, and for receiving said second signal from said portable tag means only when said pedestrian carrying said portable tag means is close to said vehicle and for not receiving said second signal when said pedestrian is not close to said vehicle, and for producing an alarm when receiving said second signal.

2. The system of claim 1, wherein said vehicle means comprises:

first means for generating and transmitting said first signal modulated by a pseudo noise which is unique for each different vehicle so that said first signal is reflected back by a portable tag means as said second signal;

second means for receiving said reflected second signal and for demodulating said reflected second signal using said pseudo noise and for not demodulating said reflected second signal when there is a difference in pseudo noise which identifies said reflected second signal as being originated from a different vehicle, said second means further comprising means for generating a trigger signal when said reflected second signal comprises the pseudo noise assigned to said vehicle;

alarm means for receiving said trigger signal and in response thereto for generating an alarm.

3. The system of claim 2, wherein said second means receives said second signals having a Doppler shift frequency corresponding to said vehicle; and further comprising:

detector means for receiving said second signals from said second means and for detecting frequency thereof and for generating a second trigger signal when said frequency corresponds to that assigned to said vehicle; and wherein said alarm means receives said second trigger signal and in response thereto generates an alarm.

4. The system of claim 1, wherein said vehicle means comprises:

transmitter means for transmitting said first signals having a fixed frequency;

receiver means for receiving said second signal having a Doppler shift frequency corresponding to said vehicle;

detector means for receiving said second signals from said receiver means and for detecting frequency thereof and for generating a trigger signal when said frequency corresponds to that assigned to said vehicle; and alarm means for producing an alarm in response to said trigger signal.

5. The system of claim 1, further comprising;

recording means for recording said alarm.

6. A communication system for preventing accidents between a pedestrian and a vehicle, said system comprising:

portable means to be carried by said pedestrian for receiving a first signal, and for generating and transmitting a low power second signal, and for producing an alarm only when receiving said first signal;

vehicle means to be installed in said vehicle for generating and transmitting said first signal of low power, and for receiving said second signal from said portable means only when said pedestrian carrying said portable means is close to said vehicle and for not receiving said second signal when said pedestrian is not close to said vehicle.

7. The system of claim 6, wherein said portable means and said vehicle means comprise:

vehicle ID code means for identifying each different vehicle;

first means for transmitting first signals modulated by psuedo noise corresponding to said vehicle ID code means;

second means for receiving said first signal transmitted by said first means and for detecting said pseudo noise therein, and for generating a first trigger signal in response to the detected pseudo noise;

first alarm means for receiving said first trigger signal and for producing in response thereto an alarm only when said second means receives said first signal third means for modulating said second signal using said pseudo noise and for transmitting said second signal only when receiving said first signal;

fourth means for receiving said second signal and for de-modulating said second signal using said pseudo noise and for not demodulating said second signal when said second signal comprises differences in pseudo noise; and second alarm means for receiving a second trigger signal from said fourth means only when said fourth means demodulates said second signal using said pseudo noise and in response thereto for producing an alarm.

8. The system of claim 7, wherein said portable means further comprises:

means for converting pseudo noise to said vehicle ID code means; and means for displaying said vehicle ID code means.

9. The system of claim 7, wherein said portable means and said vehicle means comprise:

pedestrian ID code means for identifying each different pedestrian;

fifth means contained in said portable means for generating said pedestrian ID code means, and for modulating said pedestrian ID code means and for transmitting by said second means;

sixth means contained in said vehicle means for converting demodulated signals into said pedestrian ID code means; and display means contained in said vehicle for displaying said pedestrian ID code means.

10. The system of claim 7, wherein said portable means and said vehicle means further comprise:

first detector means for detecting frequency of said second signal having a Doppler shift frequency corresponding to velocity of said vehicle and for supplying predetermined first trigger signals depending on said detected frequency to said first alarm means when said fourth means demodulates said second signal by said pseudo noise and for not supplying said predetermined first trigger signals to said first alarm means when said fourth means does not demodulate said second signal because of differences in pseudo noise; and second detector means for detecting frequency of said first signal having a Doppler shift frequency corresponding to said velocity of said vehicle and for supplying predetermined second trigger signals depending on said detected frequency to said second alarm means.

11. The system or claim 7, further comprising vehicle recording means installed in said vehicle for recording said alarm produced by said first alarm means portable recording means carried by said pedestrian for recording said alarm produced by said second alarm means.

12. The system of claim 7, further comprising:

first detector means for detecting frequency of said signals received from said first means and having a Doppler shift frequency; and second detector means for detecting vehicle speed from said frequency detected by said first detector means.

13. The system of claim 6, wherein said portable means and said vehicle means comprise:

first means for transmitting signals having a fixed frequency;

second means for receiving Doppler signal having a frequency deviation from said fixed frequency corresponding to velocity of said vehicle;

third means for transmitting a signal having same frequency as that of said Doppler signal;

fourth means for receiving a response signal having a Doppler shift frequency corresponding to said velocity of said vehicle;

first detector means contained in said fourth means for detecting frequency response signals and for providing a first trigger signal in response thereto;

first alarm means for producing an alarm in response to said first trigger signal;

second detector means contained in said second means for detecting frequency of said Doppler signal and for providing a second trigger signal in response thereto; and second alarm means for producing an alarm in response to said second trigger signal.

* * * * *